Dec. 3, 1946.   E. G. STONE   2,411,944
LIVESTOCK MARKING TOOL
Filed Nov. 21, 1944

Inventor:
Ernest G. Stone
By
Attorney.

Patented Dec. 3, 1946

2,411,944

UNITED STATES PATENT OFFICE 2,411,944

LIVESTOCK MARKING TOOL

Ernest G. Stone, Denver, Colo.

Application November 21, 1944, Serial No. 564,422

10 Claims. (Cl. 128—316)

This invention relates to tools and devices such as are commonly employed for the ear-marking of live stock, particularly cattle, and has as an object to provide an improved such tool.

A further object of the invention is to provide an improved live stock marking tool of ear-puncturing type.

A further object of the invention is to provide an improved combination with an ear-puncturing live stock marking tool of means automatically operable as an incident of tool manipulation to facilitate removal of the tool from marking engagement with an animal.

A further object of the invention is to provide an improved combination with an ear-puncturing live stock marking tool of means automatically operable as an incident of tool manipulation to facilitate retraction of tool marking elements from penetrating engagement with an animal member.

A further object of the invention is to provide improved retraction facilitating means adapted for convenient and automatically cooperative association with penetrative-type live stock marking tools of certain conventional designs.

A further object of the invention is to provide improved retraction facilitating means for association with certain conventional live stock marking tools that is simple and inexpensive of construction and operative mounting on such tools, fully automatic, positive and efficient in operation, free from any hampering influence on the normal functioning of the associated tool, and productive in use of practical advantage in respect to speed of marking operation, clarity of resultant marking, and convenience of tool manipulation.

With the foregoing and other objects in view, my invention consists in the construction, arrangement, and combination of elements hereinafter set forth, pointed out in my claims, and illustrated by the accompanying drawing, in which—

Figure 1:
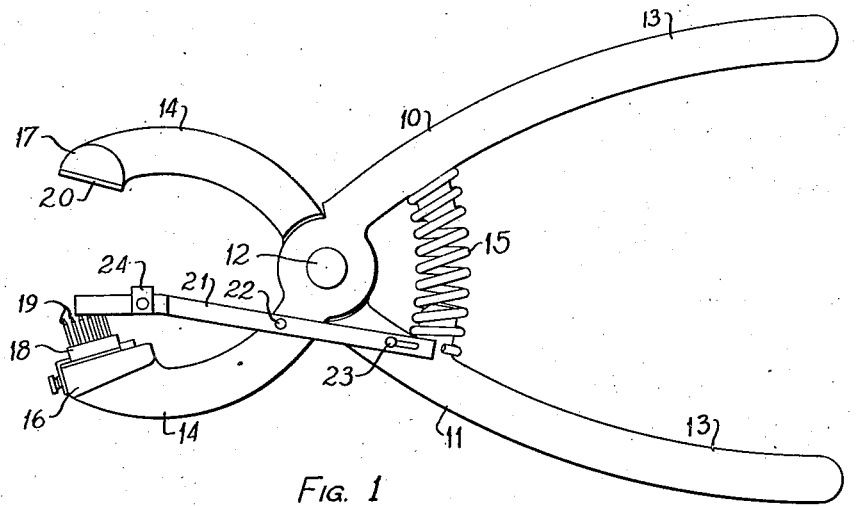
Figure 2:
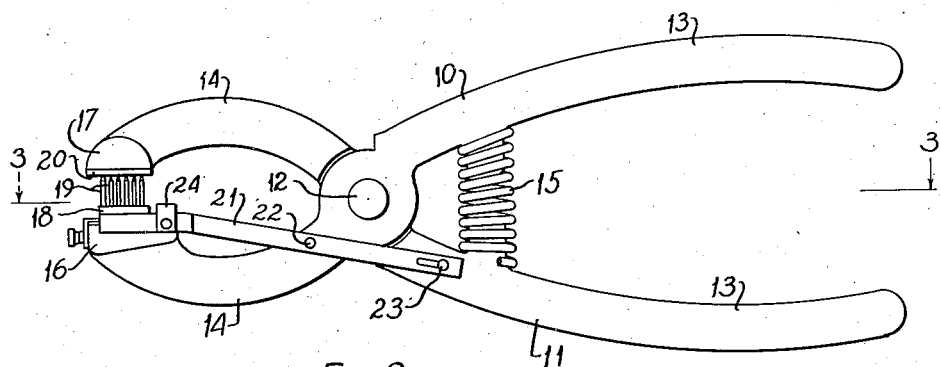
Figure 3:
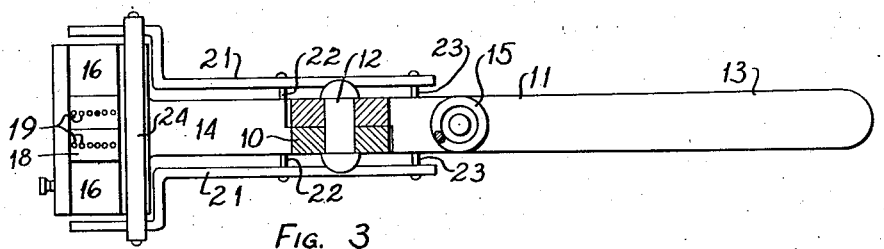

Figure 1 is a side elevation of a typical live stock marking tool, commonly in use, as improved and modified in accordance with my invention and as positioned ready for practical use. Figure 2 is a view of the device shown in Figure 1 as closed to an alternative position and relation of its movable elements. Figure 3 is a cross section taken on the indicated line 3—3 of Figure 2.

The conventional marking tool depicted by the drawing comprises a pair of closely similar, suitably curved levers 10 and 11 formed to overlap intermediate their ends and be pivotally interconnected, as at 12, to provide spacedly-opposed, relatively-longer handle portions 13 adapted for manual actuation at one end of the tool and spacedly-opposed, relatively-shorter jaw portions 14 at the other end of the tool adapted to embracingly grip an animal member in response to rapprochement of the handle portions 13. An expansive coil spring 15 operatively engages between the handle portions 13 to normally position and yieldably hold said handle portions at the limit of their separation with the jaw portions 14 correspondingly held at their maximum separation for convenient reception of the animal member to be marked therebetween, and outer end inner surfaces of the jaw portions 14 are extended laterally at each side of their associated levers to form opposed, complementary heads 16 and 17, shown as carried respectively by the levers 10 and 11, whereof the opposed flat faces are substantially parallel when the handle portions 13 are in the position shown by Figure 2. The face of the head 16 is worked and suitably arranged for the removable and replaceable secure mounting of interchangeable blocks 18, each of which fixedly and perpendicularly supports a plurality of needles 19 spacedly disposed to outline any desired numeral, symbol, or pattern wherewith, either singly or in combination, the animal is to be marked. Outer ends of the needles 19 terminate in a common plane disposed to register against the face of the head 17 when the jaw portions 14 are closed together, and said head 17 carries a facing 20 of relatively yieldable material, such as wood, fiber, hard rubber, and the like, against which the normally sharp free ends of said needles may impinge and close without damage thereto.

The cooperating elements of the tool thus far described are old in the art in the construction and relationship shown, and are employed for the marking of live stock to punch the pattern outlined by the needles 19 as a series of tiny perforations through a thin member, usually an ear, of an animal by closing of the handle portions 13 towards each other against the pressure of the spring 15. The needles 19 are promptly withdrawn after having penetrated the animal member, the tool removed, and a suitable ink or dye is brushed over the perforated area to enter and permanently contrastingly color the punctures with indelible fixing effect of the marking thus made. As conventionally constructed and commonly used, the tool hereinabove described has disadvantage in that the needles 19 do not readily retract from penetrating relation with the animal member when and as the jaw portions 14 are permitted to separate, and in that the needle points are apt, even under most careful handling, to scratch, tear, and lacerate the animal member surface, particularly at and about the punctures constituting the desired pattern, with consequent blurring and loss of definition in the marking ultimately obtained.

Supplementing the elements of the conventional tool shown and described, in operative association therewith, and arranged for automatic functional actuation incidental to manipulation thereof, the instant invention provides means to facilitate prompt and complete retraction of the needles from the animal member and to guard against premature engagement of the needle points with the animal member surface during tool application, thereby obviating the disadvantages and objections above noted.

A simple and practical embodiment of the invention is shown in the drawing as comprising a pair of identical members 21 cooperable in spaced opposition to form an end-opening yoke, each of said members 21 having a relatively-long, straight portion disposed along a side of and in overlying relation with adjacently-diverging portions of the levers 10 and 11 on the same side of the pivot 12 as the head 16, said members 21 being mounted in registration on opposite sides of the tool assembly and each pivotally interconnected with the jaw portion 14 carrying the head 16 by means of pins or studs 22 engaging through the member long straight portions and with said jaw portion at one side and forwardly of the pivot 12 to constitute an axis of member oscillation parallel with the axis of said pivot. Ends of the members 21 rearwardly of the pins or studs 22 extend past the pivot 12 and embracingly overlie the handle portion 13 of the lever 11, to which said member ends are operatively connected by means of pins or studs 23 fixedly and oppositely projecting from said handle portion in axial alignment parallel with the axis of pivot 12 to engage through slots formed for their reception in and longitudinally of the said member ends. Ends of the member 21 straight portions in advance of the pins or studs 22 extend forwardly to proximity with the inner transverse margin of the head 16, at which point they are bent outwardly into spaced parallelism with said head and extended into clearing relation past the head ends, where they are again bent to dispose their terminal portions in closely and outwardly spaced parallel relation with the head 16 outer ends and to terminate just inwardly of said head outer transverse margin. The outer end portions of the members 21 thus constitute an end-opening yoke shaped and dimensioned to embracingly register about three sides of the head 16 when the tool elements are in the closed relationship shown by Figure 2, and the free end arms of said yoke are braced and rigidly interconnected by means of a bar 24 bridging therebetween in such offset relation with the arm margins as will permit said bar to overlie the inner transverse margin of the head 16 inwardly adjacent ends of the blocks 18 when the jaw portions 14 are closed to the position of Figure 2.

The pins or studs 22 and 23 are so disposed in their engagement with the levers 10 and 11 relative to the pivot 12 as to operate, through their connection with the members 21 in the manner shown and described, to swing the yoke formed by the member 21 free ends towards and away from embracing relation with the head 16 as the jaw portions 14 of the tool are respectively closed together or divergingly opened. Thus, the jaw portions 14 being in their position of normal separation, as shown in Figure 1, the said yoke with its bar 24 is held outwardly from the head 16 and beyond the points of the needles 19 to define, together with the head 17 and its facing 20, a throat through which the animal member may be engaged without probability of contact with the needle points. When the handle portions 13 are actuated to close the jaw portions 14 together for penetration of the needles through the animal member, the said yoke and bar 24 is automatically swung towards and into embracing relation with the head 16 into such full clearing relation with the needles as will permit of their full penetration and into position to engage and hold against the adjacent animal member surface as said needles are retracted from their penetration as an incident of handle and jaw portion separation, such support of the animal member by the said yoke and bar 24 expediting and facilitating needle retraction to full and clean extraction from all penetrative engagement.

Since many changes, variations, and modifications in the specific form, construction, and arrangement of the elements shown and described may be had without departing from the spirit of my invention, I wish to be understood as being limited solely by the scope of the appended claims, rather than by any details of the illustrative showing and foregoing description.

I claim as my invention—

1. The combination with a live stock marking tool having hingedly-associated jaws terminating in complementary, opposed, piercing and abutment heads, and means for actuating said jaws, of a yoke mounted for travel with and oscillation about an axis spacedly paralleling the jaw hinge axis relative to said piercing head, and connections between said yoke and jaw actuating means positively operable as an incident of tool manipulation to swing said yoke relative to its associated head in a direction opposite to that of said head travel.

2. The combination with a live stock marking tool having hingedly-associated jaws terminating in complementary, opposed, piercing and abutment heads, and means for actuating said jaws, of a piercing-head-embraceable yoke mounted for travel with and oscillation about an axis spacedly paralleling the jaw hinge axis relative to said head, and connections between said yoke and jaw actuating means positively operable as an incident of tool manipulation to swing said yoke into embracing relation with the piercing head as the latter approaches the abutment head and out of embracing relation with said piercing head as the latter separates from the abutment head.

3. The combination with a live stock marking tool having hingedly-associated jaws terminating in complementary, opposed, piercing and abutment heads, and means for actuating said jaws, of a yoke pivotally carried by the piercing head jaw for oscillation about an axis spacedly paralleling the jaw hinge axis into and out of embracing relation with said piercing head, and connections between said yoke and the jaw actuating means positively, uniformly, and automatically operable to swing said yoke into embracing relation with its associated head as the latter approaches the abutment head and out of such embracing relation and away from the associated head as the latter separates from the abutment head.

4. The combination with a live stock marking tool having crossed levers hingedly-associated to provide correspondingly-movable jaw and handle portions, complementary, opposed, piercing and abutment heads terminating said jaw portions, and resiliently-yieldable means normally maintaining said jaw and handle portions at the limit of their relative separation, of a yoke pivotally carried by the piercing head jaw for oscillation about an axis spacedly paralleling the jaw hinge axis into and out of embracing relation with said piercing head, and yoke mounting extensions offset radially from and by-passing the jaw hinge axis to overlie and slidably connect with fixed points on the opposite sides of the abutment head handle portion, whereby said yoke is linked for positive, uniform actuation consequential to manipulation of the tool handle portions.

5. In operative combination with a live stock marking tool having hingedly-associated jaws terminating in complementary, opposed, piercing and abutment heads, and means for actuating said jaws, a yoke mounted for travel with and oscillation about an axis spacedly paralleling the jaw hinge axis relative to said piercing head, and connections operable as an incident of tool manipulation to positively and uniformly swing said yoke relative to its associated head between the latter and the abutment head and in a direction opposite to that of the piercing head travel.

6. In operative combination with a live stock marking tool having hingedly-associated jaws terminating in complementary, opposed, piercing and abutment heads, and means for actuating said jaws, a piercing-head-embraceable yoke mounted for travel with and oscillation about an axis spacedly paralleling the jaw hinge axis relative to said head, and connections operable as an incident of tool manipulation to positively and uniformly swing said yoke between said piercing and abutment heads into embracing relation with the former as it approaches the abutment head and out of such embracing relation as the said heads separate.

7. In operative combination with a live stock marking tool having hingedly-associated jaws terminating in complementary, opposed, piercing and abutment heads, and means for actuating said jaws, a yoke pivotally carried by the piercing head jaw for oscillation about an axis spacedly paralleling the jaw hinge axis into and out of embracing relation with said piercing head, and connections between said yoke and the jaw actuating means automatically operable to positively and uniformly swing said yoke between said piercing and abutment heads into embracing relation with the former as it approaches the abutment head and out of such embracing relation as the said heads separate.

8. In operative combination with a live stock marking tool having crossed levers hingedly associated to provide correspondingly-movable jaw and handle portions, complementary, opposed, piercing and abutment heads terminating said jaw portions, and resiliently-yieldable means normally maintaining said jaw and handle portions at the limit of their relative separation, a yoke pivotally carried by the piercing head jaw for oscillation about an axis spacedly paralleling the jaw hinge axis into and out of embracing relation with said piercing head, and yoke mounting extensions offset radially from and by-passing the jaw hinge axis to overlie and slidably connect with fixed points on the opposite sides of the abutment head handle portion, whereby said yoke is linked for positive, uniform actuation between and relative to said heads consequential to manipulation of the tool handle portions.

9. In a device of the character described having hingedly-associated jaws terminating in complementary, opposed, piercing and abutment heads, and means for actuating said jaws, an end-opening yoke, spaced, parallel mounting extensions projecting from said yoke closed end for disposition on opposite sides of and pivotal connection with the piercing head jaw to mount said yoke for oscillation about an axis spacedly-paralleling the jaw hinge axis between said heads and into and out of embracing relation with the piercing head, and connections between the ends of said mounting extensions remote from said yoke and opposite sides of said jaw actuating means operable to swing said yoke relative to its associated piercing head as an incident of jaw manipulation.

10. In a device of the character described having crossed levers hingedly associated to provide correspondingly-movable jaw and handle portions, complementary, opposed, piercing and abutment heads terminating said jaw portions, and resiliently-yieldable means normally maintaining said jaw and handle portions at the limit of their relative separation, an end-opening yoke, spaced, parallel mounting extensions projecting from said yoke closed end for disposition on opposite sides of and pivotal connection with the piercing head jaw to mount said yoke for oscillation about an axis parallel with the lever hinge axis between said heads and into and out of embracing relation with the piercing head, longitudinally-slotted ends on said extensions overlying opposite sides of the abutment head handle portion on the side of the lever hinge axis remote from said yoke, and aligned pins fixedly-outstanding from the opposite sides of said abutment head handle portion and slidably engaging within the slotted mounting extension ends to operatively connect said yoke for automatic actuation consequential to manipulation of the tool handle portions.

ERNEST G. STONE.